Feb. 23, 1960  W. A. RAY  2,925,988
VALVE OPERATING MEANS
Filed Jan. 16, 1958  2 Sheets-Sheet 1
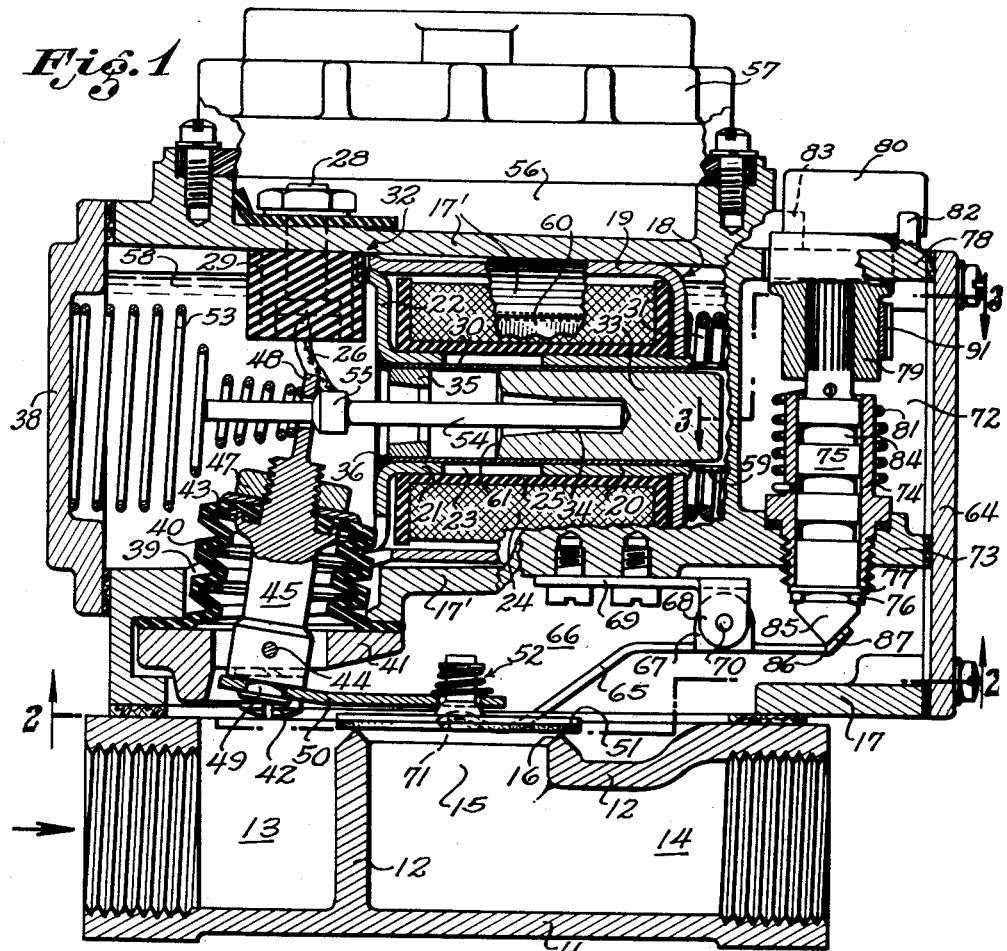
INVENTOR.
WILLIAM A. RAY
BY John H. Rouse,
ATTORNEY.

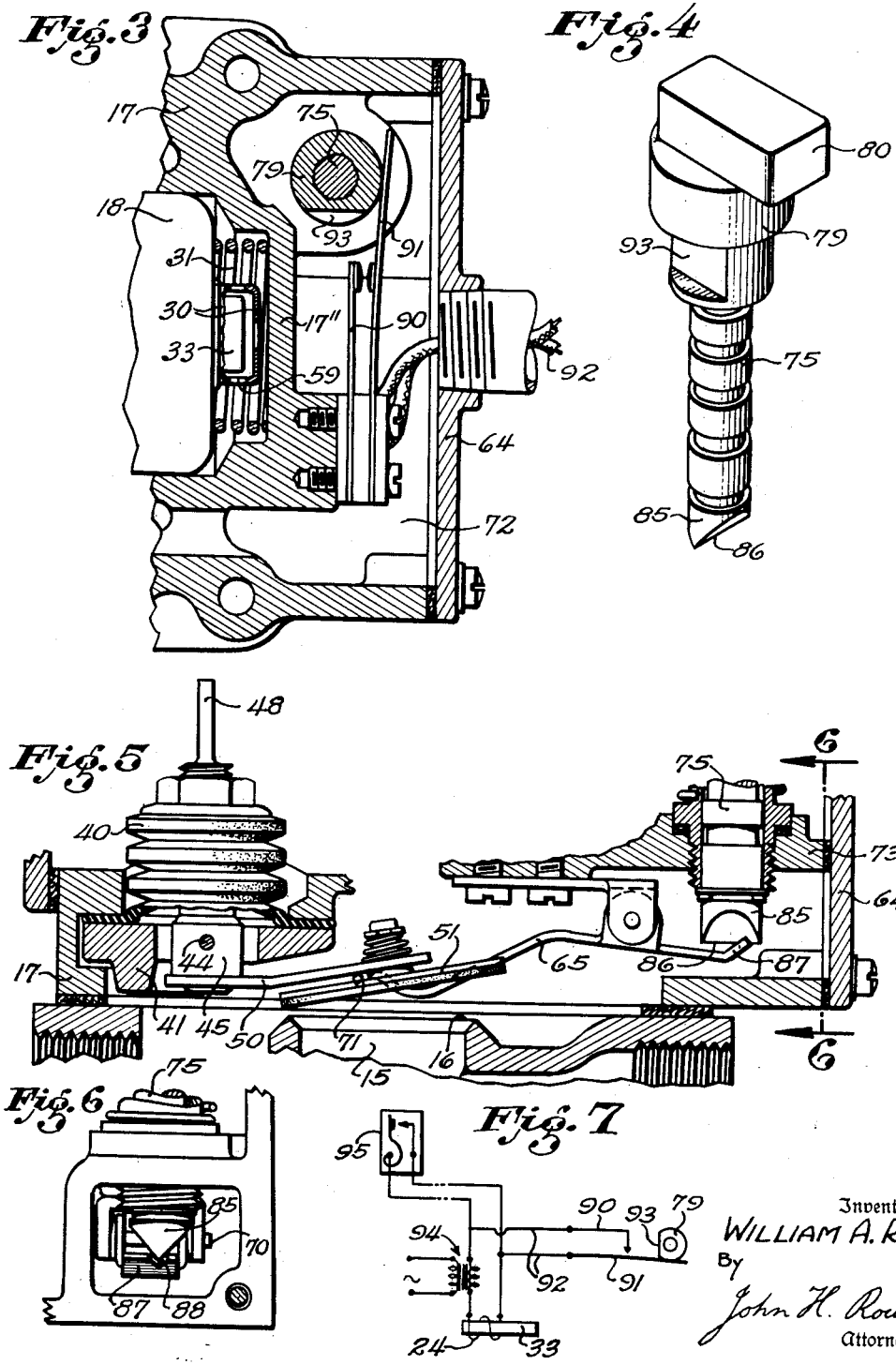

United States Patent Office 2,925,988
Patented Feb. 23, 1960

2,925,988

VALVE OPERATING MEANS

William A. Ray, North Hollywood, Calif., assignor to General Controls Co., Glendale, Calif., a corporation of California Application January 16, 1958, Serial No. 709,222

17 Claims. (Cl. 251—68)

This invention relates to valve operating means, and more particularly to the combination with a power operated valve structure of manual means for operating the valve in the event of failure of the power. The invention has particular utility in connection with a system wherein power operation of the valve is automatically controlled, as by a thermostat or the like, and the manually operated means is rendered ineffective when the power is restored.

One object of the invention is to provide a manual valve-operating means which is separate from the power operator and from the housing in which it is contained.

Another object is to provide the power operator in the form of a solenoid device working in a reservoir containing viscous liquid, and to arrange the manual operating means outside the reservoir.

Another object is to arrange the power operator so that operation of the valve by the manual means does not involve movement of the power operator.

Another object is to provide a manual valve operator whose main part is mounted in the control chamber of the valve and acts substantially directly on the valve closure.

Another object is to provide improved means for operating a valve manually, and for releasably holding it in operated position.

Further objects and advantages of the invention will become apparent from the following description and accompanying drawing, and from the appended claims.

In the drawing:

Figure 1 is a view, in vertical section, of a valve structure embodying this invention; a portion of the structure at its right being broken away to show parts toward its back;

Figures 2 and 3 are fragmentary horizontal sections taken along the lines 2—2 and 3—3, respectively, of Fig. 1;

Figure 4 is a perspective view of the stem 75 and its handle member 79;

Figure 5 is a view of a portion of the valve structure as shown in Fig. 1 but with the valve in manually-opened position;

Figure 6 is a fragmentary section taken along the line 6—6 of Fig. 5; and

Figure 7 is an electric circuit adapted for use in connection with operation of this valve structure.

In the drawing the numeral 11 indicates a valve casing having a passage therethrough which is divided by an angled partition 12 to form an inlet chamber 13 and an outlet chamber 14, the horizontal portion of the partition having a port 15 around whose inlet end is an annular valve-seat 16.

Mounted on the valve casing is a hollow body 17 which, together with an end plate 64 secured thereto, encloses the open top of the valve casing and provides below it a chamber 66 which is an extension of the inlet chamber 13. The body 17 has toward its right-hand end means, including walls 17', forming a generally cylindrical socket for a solenoid device or electromagnet generally indicated at 18, the solenoid device and the socket being tapered conformingly and so that when the device is seated there is a space between its right-hand end and the end wall 17" of the socket, as can be seen in Fig. 3.

The solenoid device 18 has a magnetic frame comprising a cup-shaped outer shell 19, a tubular member 20 inside the shell and rigidly secured at its outer end in a central opening through the end wall of the shell, and another tubular member 21 inside the shell in alignment with member 20 and having at its outer end a flange portion 22 fitting the mouth of the shell and secured thereto as by welding. The inner ends of the tubular members 20, 21 are spaced apart to provide an air-gap 23. In the annular space between shell 19 and members 20, 21 is an energizing coil 24 wound on a bobbin 25 and having leads 26 which extend through openings in the shell-flange 22 to a pair of sub-terminals 28 mounted in an insulating block 29 and projecting sealingly through openings in the top of body-portion 17'.

Fitting snugly inside the tubular frame-members 20, 21 is a cylindrical guide-tube 30, of thin nonmagnetic material, whose cup-like right-hand end portion (outside member 20) is expanded, and its left-hand extremity flared around, and soldered to, the mouth of member 21 to hold the guide tube securely in place. A spring 31, compressed between the right-hand end of the solenoid device and wall 17", serves to maintain the left top edge of the device in abutment with the insulating block 29, there being a rib and notch arrangement indicated at 32 for orienting the device about its axis. Freely reciprocable inside the guide tube 30 is a cylindrical armature or magnetic plunger 33 having a deep axis recess 34, and in the mouth of the guide tube is an annular stop member 35 which is secured in place as by welding indicated at 36.

In the left-hand wall of body 17 is a large opening closed by a cap 38, and in the curved lower portion 17' of the body, at its left, is an opening 39 leading to the inlet chamber-extension 66 and closed by a flexible bellows 40, of material such as synthetic rubber, whose bottom flange is clamped to the body around the opening 39 by an annular member 41 fastened by screws 42, there being stiffening ribs or rings 43 in the convolutions of the bellows. Pivoted at its lower end on a pin 44 mounted in openings in member 41 is a round arm 45 whose upper portion extends through opening 39 and is provided with a collar to which the upper end of bellows 40 is sealingly clamped by a nut 47 cooperating with screwthreads on the arm. At its top arm 45 is machined to form a flat portion 48. Secured to the bottom of arm 45, by means of a rivet portion 49 on the arm, is a generally-flat horizontal arm 50 which carries on its free end a closure disk 51 cooperable with the valve seat 16; there being a floating connection 52, of conventional form, between arm 50 and the closure disk.

The pivoted arm 45 and closure arm 50 are biased in clockwise direction by the force of a spring 53 compressed between cap 38 and the flat top portion 48 of arm 45, rocking of arms 45, 50 in this direction being limited by the seating of closure 51. Loosely supported at its left in an opening through the top portion of arm 45 is a rod 54 which projects through stop ring 35 into the recess 34 of the plunger and has a rounded tip engageable with the bottom of the recess, the rod having intermediate its ends a collar 55 engageable with arm 45.

In the top of body 17 is a shallow recess 56 over which is a cover 57, of molded insulating material, for mounting of terminals (not shown) electrically connected to the sub-terminals 28. The hollow interior of body 17 (leftward end wall 17") is almost filled with a viscous liquid indicated at 58. To permit relatively unrestricted passage of this liquid between opposite ends of the plunger 33 there are openings 59 (see Fig. 3) in the head of the guide tube 30, the space at the right of the solenoid device being in communication with the space at its left by way of passages 60 between the body portion 17' and the solenoid device.

The parts are shown in normal position in Fig. 1. When current is passed through coil 24 the plunger 33 is attracted leftward into engagement with the stop ring 35, bridging the air-gap 23. This movement of the plunger effects, through rod 54, counterclockwise rocking of arms 45, 50 to unseat closure 51. When the coil is deenergized, the parts return to the positions shown in Fig. 1 under the force of spring 53.

That part of the valve structure thus far described is substantially identical with the structure disclosed in my copending application Serial No. 611,543 filed September 24, 1956.

The main purpose of the viscous liquid 58 in the valve structure is to prevent hum or vibration when the solenoid device is energized by alternating current. As is more fully described in said application Serial No. 611,543, when this liquid is of suitably-high viscosity and the solenoid plunger is in its attracted position in engagement with the stop ring 35, axial vibration of the plunger is prevented because of the so-called "gluing" action of the film of liquid between the cooperating surfaces of the plunger and the stop ring. This ring does not function as a shading coil and may be of either magnetic or non-magnetic material. It may be slotted, if desired, to reduce eddy currents. The liquid also prevents radial A.C. vibration of the free inner end of the plunger into and out of engagement with the guide tube 30.

When the cooperating surfaces of the plunger and tube are relatively large, operative movements of the plunger are retarded by the action of the liquid between these surfaces, so that the noise caused by impact of the plunger against the stop is reduced. The retarded movement of the plunger is not due to any dashpot effect as there is free communication of the liquid between the ends of the plunger, as was described hereinabove. If retarding of the plunger is not desired, it may be made generally square in cross section (as shown in my Patent No. 2,098,196) so that only a small area of the plunger co-operates with the guide tube. The liquid may be considered here as being analogous to an element of a low-pass mechanical filter since it permits movement of the parts at low rate but greatly attenuates their movement at the relatively high rate of the current alernations. The action of the liquid is fully described in my copending application Serial No. 672,688 filed July 18, 1957.

When the viscosity of the liquid employed is high, the central part of the stop-engaging end of plunger 33 may be undercut slightly, as indicated at 61, so that only a narrow margin of the end surface of the plunger engages the stop-ring 35; this is to avoid significant delay of initial movement of the plunger under the force of its bias when the solenoid is deenergized.

For operating the closure 51 manually (as in the event of failure of the electric power) there is a lever 65 mounted in the inlet chamber 66. Lever 65 is made of sheet metal and has intermediate its ends a pair of turned-up ears 67 cooperating with similar ears 68 on a bracket 69 secured to the underside of body 17, a pin 70 passing through aligned openings in the ears serving as a pivot for the lever. The lever is positioned (by means to be described) so that the hooked extremity 71 of its downwardly-bent left-hand portion is normally spaced by a short distance below a lateral extension 50' (see Fig. 2) of closure-arm 50.

The valve structure has at its right-hand end a compartment 72 covered by plate 64 and separated from chamber 66 by a horizontal wall 73. Sealingly mounted in an opening through this wall is a sleeve 74 wherein a stem 75 is rotatable. At its end inside chamber 66 this stem is grooved to receive a snap-ring 76 which, through a washer 77 abutting sleeve 74, prevents upward movement of the stem. Pressed on the upper part of stem 75, and projecting freely through an opening in the top wall 78 of compartment 72, is a member 79, of electrical insulating material, having a handle portion 80 at its top.

Connected at its opposite ends to sleeve 74 and stem 75 is a spring 81 which biases the stem in clockwise direction, as viewed from the top, so that the stem-handle 80 is normally in engagement with a stop 82 projecting upwardly from wall 78, rotation of the stem in counterclockwise direction being limited to an angle of 90° by another similar stop 83. The free length and arrangement of spring 81 are such that stem 75 is also urged upwardly to maintain washer 77 seated on sleeve 74 and to prevent downward movement of the stem. The portion of stem 75 inside sleeve 74 is provided with a plurality of grooves 84 which may be filled with cock-grease to lubricate these parts and to seal the clearance space between them.

As is best seen in the perspective view of Fig. 4, the stem 75 is provided at its bottom with a wedge-shaped tip 85. When the stem is in its normal biased position, as shown in Fig. 1, the edge 86 of wedge 85 forms a stop limiting tilting of the lever 65 counterclockwise so that its hooked extremity 71 is closely adjacent the underside of closure-arm 50, 50', the lever being biased in this direction by gravity. The portion 87 of the lever at the right of stem-edge 86 is bent upwardly, conveniently at the same angle as the sides of wedge 85, so that when the stem is rotated counterclockwise by manipulation of its handle 80, a corner of the horizontal edge 86, bearing against the inclined surface of the lever-portion 87 causes the lever to tilt clockwise and, by engagement of the lever-portion 71 with arm 50, 50', effects unseating of closure 51.

When, with such tilting of lever 65, the brink of its end portion 87 reaches the plane of stem-edge 86, this edge rides on that brink until (when the stem has been rotated through about 90°) it reaches a V-notch 88, the lever then tilting slightly counterclockwise under the force of its bias and latches the stem-edge in the notch so that the stem remains stationary when its handle is released. The parts are then in the valve-open position shown in Figs. 5 and 6.

The stem 75 is normally held in latched position by the relatively large force of spring 53 acting on lever 65 through arms 45, 50, 50'; however, if it is desired to reclose the valve, the latch may be released by manual clockwise rotation of the stem through a small angle. The tip 85 of stem 75, while preferably wedge-shaped as shown since it then presents a large surface for the lever to rest on while in normal position, could be in the form of a thin strip projecting axially from the stem to define the horizontal edge 86. The angle of the lever-portion 87 relative to the plane of this edge determines the degree of tilting of the lever in operation.

When the valve is opened manually, as described, the closure arms 45, 50 are rocked through an angle slightly less than the angle through which they are rocked by the solenoid operator, so that when the same is energized (upon resumption of the power) the arms are rocked sufficiently farther counterclockwise to free the lever 65 and permit release of the stem-edge 86 from notch 88 so that stem 75 returns to its normal position under the force of its bias.

It is to be observed that in the manual operation of the valve the solenoid plunger 33 remains stationary because of the loose connection between it and arm 45. This facilitates the manual operation and is of particular advantage when there is viscous liquid in the plunger tube. Further, free movement of the plunger through virtually its full stroke upon resumption of the power produces sufficient force to ensure movement of arms 45, 50 to release the latching means.

The chief purpose of the valve structure of this invention is to control supply of fuel gas to a furnace burner under the normal control of a thermostat responsive to the temperature of a space heated by the furnace; the valve being manually openable, as described, to effect supply of fuel during failure of the electric service. Inasmuch as the thermostat may be in satisfied or open condition upon resumption of the electric service while the valve is in manually-opened condition, means are provided for then ensuring energization of the solenoid operator. These means comprise a switch mounted in compartment 72 and consisting of a fixed contact blade 90 and a cooperating movable blade 91 whose free end bears against a round surface of stem-member 79 when the stem is in normal position so that the blades are then held out of contact with each other. A portion of member 79 is cut away, as indicated at 93, to permit blade 91 to move into contact with blade 90 when the stem is rotated to valve-opening position. Leads 92, passing through an opening in plate 64, are provided for connecting the switch 90, 91 in an electric circuit such as that in the diagram of Fig. 7. In this diagram the coil 24 of the solenoid operator is shown connected to a source 94 of low-voltage alternating current in series with a thermostat 95. The switch 90, 91 is connected in parallel with the thermostat so that upon resumption of electric service after the valve has been opened manually the solenoid is energized regardless of the condition of the thermostat; energization of the solenoid being only momentary if the thermostat contacts are then open, as the switch 90, 91 opens when the manually operated means is tripped.

The specific embodiment of my invention herein shown and described is obviously susceptible of modification without departing from the spirit of the invention, and I intend therefore that no limitation be placed on the invention except as defined by the scope of the appended claims.

I claim as my invention:

1. In a valve structure: a valve casing having an inlet and an outlet and providing a chamber having a port between said inlet and said outlet for flow through the casing, and a valve seat in the chamber around said port; a valve closure cooperable with said seat; a solenoid operator including a plunger and a coil around said plunger, all mounted on the outside of the casing; means, extending sealingly through an opening in a wall of said chamber, forming a one-way drive connection between said plunger and said closure for acting in one direction to unseat the closure from said port upon energization of said coil; and manually operated means, mounted in said chamber, for moving said closure in said one direction to unseat the closure manually and including a part extending sealingly from the chamber to the exterior of the casing.

2. A valve structure according to claim 1 including means forming around said solenoid coil a reservoir for liquid, and viscous liquid in said reservoir and with said plunger being immersed in said liquid.

3. In a valve structure: a valve casing having an inlet and an outlet and providing a chamber having a port for flow between said inlet and said outlet through the casing, and a valve seat in the chamber around said port; a valve closure cooperable with said seat; an arm in said chamber and connected to said closure for operating said closure and movably mounted on the casing, said arm having a portion extending sealingly to the exterior of the casing through an opening in a wall of said chamber; a solenoid operator including a plunger, a coil around said plunger for moving said plunger, all mounted on the outside of the casing and cooperable with said arm-portion, the plunger being connected to said arm member through a one-way drive connection so that when said coil is energized it effects movement of said arm in one direction to closure-unseating position; and means, mounted in said chamber, for moving said arm manually in said one direction to closure-unseating position independently of said plunger and including a manually movable part extending sealingly from the chamber to the exterior of the casing.

4. In a valve structure: a valve casing having an inlet and an outlet and providing a chamber having a port for flow between said inlet and said outlet through the casing and a valve seat in the chamber and around said port; a valve closure cooperable with said seat; an arm carrying said closure and pivotally mounted on the casing, said arm having a portion extending sealingly to the exterior of the casing through an opening in a wall of said chamber; means biasing said arm to closure-seating position; a solenoid operator including a plunger and a coil around said plunger for moving said plunger, all mounted on the outside of the casing and cooperable with said arm-portion through a one-way drive connection, said coil when energized serving to rock said arm in one direction through said connection to closure-unseating position; and means for rocking the arm manually in said one direction to closure-unseating position when said operator is unenergized, comprising a lever mounted in said chamber and having an end portion operatively engageable with the arm at a point adjacent said closure, and means extending sealingly to the exterior of the casing for operating said lever without moving said plunger.

5. A valve structure according to claim 4 including means forming around said solenoid coil a reservoir for liquid, and viscous liquid in said reservoir with said plunger being immersed in said liquid.

6. A valve structure according to claim 4 including means, inside said chamber, for latching said lever in closure-open position.

7. In a valve structure: a valve casing having a passage for flow therethrough; a valve for controlling said flow and comprising a closure movable between closed and open positions and biased to closed position; a solenoid coil mounted on said casing magnetically cooperating with a plunger for moving the same in response to energization of the coil; means defining, when said operator is energized, a one-way drive connection between said plunger and said closure for acting in one direction to move the closure to open position; and manual means for moving said closure in said one direction to effect opening of the closure when the operator is unenergized and independently of said plunger so that the plunger remains stationary when the closure is opened by said manual means.

8. In a valve structure: a valve casing having an inlet and an outlet and having a port between said inlet and said outlet for flow through the casing and a valve seat around said port; a valve closure cooperable with said seat; an arm carrying said closure and pivotally mounted on the casing; a solenoid coil mounted on said casing and magnetically cooperating with a plunger for producing movement of the same from a normal position upon energization of the coil, said plunger being connected through a one-way drive connection with said arm for rocking it in one direction to closure-unseating position when the coil is energized; means biasing said arm to closure-seating position and said plunger to said normal position; and manual means, engageable with said arm, for rocking it in said one direction to closure-unseating position and to move said closure from said port while the plunger remains in said normal position.

9. In a valve structure: a valve casing providing a chamber having an inlet and an outlet and a port between said inlet and said outlet for flow through the casing and a valve seat in the chamber around said port; a valve closure cooperable with said seat and biased to closed position; a solenoid coil mounted on the outside of the casing and cooperating magnetically with a plunger in said coil for moving the same in response to energization of the coil; means forming, when said operator is energized, a one-way drive connection between said plunger and said closure for moving said closure in one direction to open position upon energization of said coil; said connection extending sealingly through an opening in a wall of said chamber; and manual means, inside said chamber and including a part extending sealingly to the exterior of the casing, for opening the closure in said one direction when the oil is unenergized so that said plunger remains stationary when the closure is opened by said manual means.

10. A valve structure according to claim 9 including means forming around said solenoid coil a reservoir for liquid, and viscous liquid in said reservoir with said plunger being immersed in said liquid.

11. In a valve structure: a valve casing providing a chamber having an inlet and an outlet and a port between said inlet and said outlet for flow through the casing and a valve seat in the chamber around said port; a valve closure cooperable with said seat; an arm carrying said closure and pivotally mounted on the casing, said arm having a portion extending sealingly to the exterior of the casing through an opening in a wall of said chamber; a solenoid coil mounted on the outside of the casing and cooperating magnetically with a plunger in said coil for moving the same from a normal position upon energization of the coil, said plunger being connected through a one-way drive connection to said arm-portion for rocking the arm in one direction to closure-unseating position when the coil is energized; means biasing said arm to closure-seating position and said plunger to said normal position; and manual means, engageable with a portion of said arm inside the chamber, for rocking the arm in said one direction to closure-unseating position when the operator is unenergized and while the plunger remains in said normal position.

12. A valve structure according to claim 11 including means forming around said solenoid coil a reservoir for liquid, and viscous liquid in said reservoir with said plunger being immersed in said liquid.

13. A valve structure according to claim 11 wherein said means for opening the valve manually comprises a lever mounted in said chamber and having an end portion operatively engageable with said arm at a point adjacent said closure, and means extending sealingly to the exterior of the casing for operating said lever.

14. A valve structure according to claim 13 including means, inside said chamber, for latching said lever in closure-open position.

15. In combination: a pivoted lever; and means for tilting said lever comprising a stem mounted for rotation about a first axis at right-angles to the pivotal axis of said lever, said stem being formed at one end to provide a straight edge of substantial length extending radially of said first axis and generally at right-angles to said first axis, said lever having a flat surface engageable with said edge, said surface being in a plane parallel to the pivotal axis of the lever and inclined relative to said first axis, means biasing said lever to maintain said surface in engagement with said edge, means for rotating said stem between and to a first and a second position which are angularly displaced by 90°, means preventing axial movement of said stem when the same is rotated by said rotating means between said first and second positions, said stem having said edge in full engagement with said surface and parallel to the pivotal axis of the lever when the stem is in said first position, said stem edge moving on said surface when the stem is then rotated through 90° to said second position, said stem in movement from said first position to said second position having a corner of said edge engaging and sliding along said surface to pivot said lever.

16. A combination according to claim 15, including means biasing said stem to said first position, and said lever-surface and said stem-edge having frictionally interengaging holding portions, said means biasing said lever also holding said interengaging portions in engagement to maintain the stem in said second position and thereby hold the lever in its pivoted position.

17. A combination according to claim 16 including means effective upon rotation of said stem from second position toward said first position reducing the force of said lever-bias when said stem is returned to its said first position.

References Cited in the file of this patent

UNITED STATES PATENTS

| | | |
|---|---|---|
| 2,155,358 | Cyr | Apr. 18, 1939 |
| 2,357,013 | McKinnis | Aug. 29, 1944 |
| 2,712,429 | Ray | July 5, 1955 |